Reissued Apr. 25, 1933

Re. 18,802

UNITED STATES PATENT OFFICE

JOHANN JOSEPH STOECKLY AND RICHARD BARTUNEK, OF TELTOW SEEHOF NEAR BERLIN, GERMANY, ASSIGNORS TO AMERICAN GLANZSTOFF CORPORATION, OF NEW YORK, N. Y., A CORPORATION OF DELAWARE

PROCESS FOR MAINTAINING THE COMPOSITION OF VISCOSE PRECIPITATING BATHS CONTAINING MAGNESIUM SULPHATE

No Drawing. Original application filed November 27, 1928, Serial No. 322,295, now Patent No. 1,793,649, and in Germany December 15, 1927. Divided and application filed June 17, 1930, Serial No. 461,845. Patent No. 1,863,172, dated June 14, 1932. Application for reissue filed October 21, 1932. Serial No. 638,914.

This is a reissue application of U. S. Patent No. 1,863,172 which patent is a division of application Serial No. 322,295, filed November 27, 1928, and issued as U. S. Patent 1,793,649, of which the following is a specification:

In the manufacture of artificial threads, films, small bands and hairs from viscose, sulphuric acid precipitating baths are used, which, in addition to sodium sulphate, also contain magnesium sulphate. During use the amount of sulphuric acid contained in the spinning bath becomes reduced, owing to its being neutralized by the alkali of the viscose, and the quantity of the spinning bath decreases, because a portion of the liquid is carried away by the products, e. g., the threads, and passes into the washing water. The amount of sodium sulphate contained in the bath is, to a certain extent, automatically supplemented inasmuch as this salt is formed continuously by the double decomposition of the alkali with the sulphuric acid. Finally gradual dilution of the spinning bath takes place, according to the amount of water contained in the viscose, and in the case of viscoses which are not very highly concentrated, not only compensates for the loss of volume in the bath, due to the liquid being carried off by the thread, but may even cause the bath to increase in bulk. All these progressive changes which take place in the bath during the process of precipitating the viscose must be compensated for or reversed, preferably at intervals but also progressively. Hitherto this has generally been effected by allowing any excess of the bath that may form to run away and making up the necessary concentration in sulphuric acid and salts by the addition of these substances to the bath from the outside.

In spinning baths of a simple kind, which contain only sulphuric acid and sodium sulphate as ingredients, it has repeatedly been proposed to employ so-called acid and salt regenerating processes, consisting either in evaporating the diluted spinning baths, so as to counteract dilution by the water, or in evaporating so-called upper baths, or the washing baths or subsequent fixing baths containing the same two substances and returning the concentrated product to the main spinning bath. When using such regenerating processes smaller quantities of fresh sulphuric acid and fresh sodium sulphate are required to make up the spinning bath to proper strength, or such additions of fresh acid and salt may, in some cases be entirely superfluous.

The present invention has for its object the provision and elaboration of a regeneration process which can be used for spinning baths which are required to contain magnesium sulphate in addition to sulphuric acid or sulphuric acid and sodium sulphate. That with such baths the simple evaporating process does not achieve the desired object has been shown by experiments, both with the main bath and also with the so-called upper baths, washing baths and the like. It has been found, as a matter of fact, that in the simple evaporation of bath solutions containing both salts simultaneously, the sodium sulphate content increases, disproportionately to the magnesium sulphate content, since fresh sodium sulphate is continuously being formed in the spinning bath. The result is that an excess of sodium sulphate is obtained while it is utterly impossible to keep the magnesium sulphate in solution in the manner required or to recover it.

If the regeneration, particularly of the magnesium sulphate, is to be an effective and practical one and the above described composition of the main bath is to be obtained, it is necessary that a portion of the sodium sulphate be continuously removed.

Experiments have shown that if an attempt be made to free the bath solutions indicated from an excess of sodium sulphate by crystallizing it out, the resulting deposits of salt generally contain magnesium sulphate in addition to the removed sodium sulphate and thus a proportion of magnesium sulphate is lost with the excess sodium sulphate.

We are now able to suggest a practical solution of the present problem, and are able to overcome the enumerated difficulties. For purposes of clearness, use will be made of a series of examples.

*1st example.*—Given a bath solution containing 130 gr. $H_2SO_4$ per litre,
190 gr. $MgSO_4$ per litre,
130 gr. $Na_2SO_4$ per litre.

The problem consists in freeing the bath mixture as completely as possible from sodium sulphate and then returning it in a concentrated form to the main spinning bath.

If any attempt be made to bring this bath solution into a condition for crystallizing out, by the usual methods of evaporation or cooling down, the desired end will not be achieved, because, in such case, a mixture of sodium sulphate and magnesium sulphate will precipitate.

The following method of procedure has, however, been found to be effective:

The bath solution is first diluted by about 12% so that a bath with about 115 gr. $H_2SO_4$ per litre,
165 gr. $MgSO_4$ per litre,
115 gr. $Na_2SO_4$ per litre, is obtained. This solution is now cooled down to about −5 deg. C. At this temperature sodium sulphate free from magnesium sulphate separates out in the form of Glauber salts and in such quantity that only about 47 grams of sodium sulphate per litre still remains dissolved.

The remaining final liquor is now concentrated in a suitable concentrating apparatus and returned to the main spinning bath in the concentrated form together with the magnesium sulphate, for the purpose of revivification.

In this regeneration process in all 98% $H_2SO_4$ are recovered, 63% $Na_2SO_4$ separated out and nearly the whole $MgSO_4$ maintained in the solution.

*2nd example.*—If the bath be composed of 120 gr. $H_2SO_4$ per litre,
160 gr. $MgSO_4$ per litre,
140 gr. $Na_2SO_4$ per litre, this solution may be cooled down to −5 deg. C. at once without dilution. Sodium sulphate free from magnesium sulphate separates out and the concentrated solution, poor in sodium sulphate, is again returned to the main spinning bath.

*3rd example.*—Let it be assumed that the bath solution to be worked up is composed of 100 gr. $H_2SO_4$ per litre,
200 gr. $MgSO_4$ per litre,
200 gr. $Nn_2SO_4$ per litre.

For the regeneration the solution to be treated is diluted by 15–20%, and then at once cooled down to −5 deg. C., so as to separate out Glauber salts, freed from crystals, evaporated and allowed to run back into the main spinning bath.

In the above examples the proportions and the procedure to be followed do not vary materially, even though the sulphuric acid content is subjected to considerable fluctuations (increasing, for example, to 150 gr. sulphuric acid per litre and more or decreasing to 65 gr. per litre or less). In most cases, however, the sulphuric acid content in the ordinary spinning baths, upper baths and the like fluctuate within these limits.

The examples clearly show that the magnesium salt content per litre of bath to be treated is essentially the deciding factor as to the procedure to be adopted.

If the magnesium sulphate content does not amount to more than about 170 gr. per litre, separation of the Glauber salts may be effected at once by single cooling.

If the magnesium sulphate content lies in the intermediate region between 170 and 220 gr. per litre, the magnesium sulphate content must first be diminished to less than 170 gr. per litre by suitable diluting and then after cooling down to −10 deg. C., the separation of the practically pure Glauber salts can be caused.

The process is similar when the magnesium sulphate content is greater than 220 gr. per litre.

It is expedient to separate the magnesium sulphate in the manner set forth in U. S. application, Serial Number 322,295.

If, in a bath, of high magnesium sulphate content (see Example 3) the amount of sodium sulphate content is also large, the cooling down when separating out the Glauber salts must be kept within moderate limits. If temperatures of −10 deg. C. and less be reached when the Glauber salts are being separated, there is risk of magnesium sulphate crystallizing out also if the amount thereof contained in the solution is considerable. In most cases it is well to be content to cool down to −5 deg. C.

The new process can be used partly for concentrating the main spinning bath and to free it from an excess of sodium sulphate. It can also be used for the working up of so-called drop baths which drop from spools or rollers, or of centrifuge baths which are slung off from spinning centrifuges, or of upper baths wherein spun spools are subsequently fixed or leached out. In any case the baths to be treated or parts thereof are advantageously worked up according to the process and the concentrated final liquor, poor in sodium sulphate, used with any Epsom salts, for the revivification of the main spinning bath.

It must be appreciated that the terms "sodium sulphate" and "magnesium sulphate" respectively, used in the above specification and the claims will also comprise of course the aqueous crystalline precipitations, that is to say "Epsom salt" and "Glauber's salt".

What we claim is:—

1. For maintaining the composition of sulphuric acid viscose precipitating baths containing magnesium sulphate and sodium sulphate in solution, a process comprising the steps of separating out part of the soluted sodium sulphate in substantially pure form from the bath at a magnesium sulphate content of less than about 170 gr. per litre by cooling the same, to from 0 to −10° C. separately concentrating the resulting liquor and adding it, with a proportion of magnesium sulphate to the precipitating bath.

2. For maintaining the composition of viscose precipitating baths containing in solution, in addition to sodium sulphate, not more than 170 gr. per litre of magnesium sulphate, the process consisting in cooling the bath solution down to approximately −10 deg. C., separating the mother liquor from the sodium sulphate crystals thus formed, concentrating said liquor and adding it with a suitable proportion of magnesium sulphate to the precipitating bath to be revivified.

3. In a process for maintaining the composition of viscose precipitating baths having, in solution a relatively high magnesium sulphate content as well as sodium sulphate, characterized by the fact that such baths containing more than 170 gr. of magnesium sulphate per litre, the steps of diluting until their magnesium sulphate content is less than 170 gr. per litre, cooling the diluted bath down to approximately −10 deg. C. concentrating the mother liquor separated from the sodium sulphate crystals and adding it with a suitable addition of magnesium sulphate, to the precipitating bath to be revivified.

4. In a process for maintaining the composition of a precipitating bath used in the viscose process, said bath having both a high magnesium and sodium sulphate content, the steps of diluting the bath until the magnesium sulphate content is no greater than 170 grams per litre, cooling the bath to a temperature below 0° C., separating the mother liquor from the sodium sulphate crystals thus formed, and adding this mother liquor plus magnesium sulphate to the bath.

In testimony whereof we affix our signatures.

JOHANN JOSEPH STOECKLY.
RICHARD BARTUNEK.